US009597665B2

(12) United States Patent
Nagao et al.

(10) Patent No.: US 9,597,665 B2
(45) Date of Patent: Mar. 21, 2017

(54) CATALYST SYSTEM FOR EXHAUST GAS PURIFICATION AND METHOD FOR EXHAUST GAS PURIFICATION

(71) Applicant: MITSUI MINING & SMELTING CO., LTD., Tokyo (JP)

(72) Inventors: Yuki Nagao, Saitama (JP); Ohki Houshito, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 14/786,643

(22) PCT Filed: May 15, 2014

(86) PCT No.: PCT/JP2014/062993
§ 371 (c)(1),
(2) Date: Oct. 23, 2015

(87) PCT Pub. No.: WO2014/185501
PCT Pub. Date: Nov. 20, 2014

(65) Prior Publication Data
US 2016/0082420 A1    Mar. 24, 2016

(30) Foreign Application Priority Data
May 16, 2013   (JP) ................. 2013-104447

(51) Int. Cl.
*B01D 53/94*   (2006.01)
*F01N 3/28*   (2006.01)
(Continued)

(52) U.S. Cl.
CPC ............ *B01J 23/63* (2013.01); *B01D 53/945* (2013.01); *B01J 21/04* (2013.01); *B01J 23/10* (2013.01);
(Continued)

(58) Field of Classification Search
CPC .. B01D 53/94; B01D 53/9445; B01D 53/945; B01D 2258/012; F01N 3/101; F01N 3/2803
See application file for complete search history.

(56) References Cited

U.S. PATENT DOCUMENTS

| | | | | | |
|---|---|---|---|---|---|
| 4,034,061 | A | * | 7/1977 | McArthur | ............ B01D 53/945 423/213.5 |
| 7,462,338 | B2 | * | 12/2008 | Southward | ........... B01D 53/944 423/213.5 |

(Continued)

FOREIGN PATENT DOCUMENTS

| | | | | |
|---|---|---|---|---|
| CN | 102958608 A | * | 3/2016 | ............ B01D 53/945 |
| EP | 3064270 A1 | * | 9/2016 | .............. B01J 23/44 |
| JP | 2002-147232 | | 5/2002 | |
| JP | 2002-370035 | | 12/2002 | |
| JP | 2012-016685 | | 1/2012 | |
| JP | 2012-026420 | | 2/2012 | |
| WO | WO 2012/005375 | | 1/2012 | |
| WO | WO 2013098987 A1 | * | 7/2013 | .............. B01J 23/58 |

OTHER PUBLICATIONS

Chinese Official Action—201480028321.0—Aug. 2, 2016.
(Continued)

*Primary Examiner* — Timothy Vanoy
(74) *Attorney, Agent, or Firm* — Young & Thompson

(57) ABSTRACT

In an exhaust gas purification catalyst system for use in an automobile including an exhaust gas purification catalyst product disposed in both a front section and a rear section, the exhaust gas purification catalyst product of the front section has a layered catalyst including a lower layer which contains aluminum borate.

15 Claims, 3 Drawing Sheets

(51) Int. Cl.
    *B01J 23/63*     (2006.01)
    *B01J 35/00*     (2006.01)
    *B01J 21/04*     (2006.01)
    *B01J 23/10*     (2006.01)
    *B01J 23/44*     (2006.01)
    *B01J 23/46*     (2006.01)
    *B01J 23/58*     (2006.01)

(52) U.S. Cl.
    CPC ............ *B01J 23/44* (2013.01); *B01J 23/462* (2013.01); *B01J 23/464* (2013.01); *B01J 23/58* (2013.01); *B01J 35/0006* (2013.01); *B01D 2255/1023* (2013.01); *B01D 2255/1025* (2013.01); *B01D 2255/2042* (2013.01); *B01D 2255/2063* (2013.01); *B01D 2255/2092* (2013.01); *B01D 2255/707* (2013.01); *F01N 2510/06* (2013.01); *F01N 2510/0684* (2013.01); *Y02T 10/22* (2013.01)

(56) References Cited

U.S. PATENT DOCUMENTS

2013/0116115 A1     5/2013   Sato et al.
2016/0288097 A1*  10/2016  Nagao .................... B01J 21/066

OTHER PUBLICATIONS

Hou Shuqian et al.: "Golden Years, New Heights—The 70th Anniversary Symposium for Kunming Institute of Precious Metals" YunNan Publishiing Group Company, YunNan Science and Technology Press, from the last paragraph of p. 158 to the first paragraph of p. 159, Nov. 2008.
International Search Report, PCT/JP2014/062993, Aug. 19, 2014.

* cited by examiner

US 9,597,665 B2

CATALYST SYSTEM FOR EXHAUST GAS PURIFICATION AND METHOD FOR EXHAUST GAS PURIFICATION

TECHNICAL FIELD

The present invention relates to an exhaust gas purification catalyst system employing a specific aluminum borate serving as a carrier, and to a method for purifying an exhaust gas (hereinafter may be referred to as exhaust gas purification method).

BACKGROUND ART

Exhaust gas discharged from an internal combustion engine of, for example, an automobile, contains toxic components such as hydrocarbons (HC), carbon monoxide (CO), and nitrogen oxides ($NO_x$). Hitherto, three-way catalysts have been used for removing such toxic components for detoxifying the exhaust gas.

In such three-way catalysts, there are some cases where a catalyst carrier made of aluminum borate is used. In one case of such a catalyst, a catalyst component is deposited on a powder compact whose particles are covered with aluminum borate whiskers and include voids therein, whereby gas diffusivity is enhanced (see Patent Document 1).

The present applicant previously proposed an exhaust gas purification catalyst carrier in which aluminum borate is modified with $La_2O_3$ in an amount, based on the mass of aluminum borate, of 0.3 to 2 mass %, preferably 0.4 to 2 mass %, more preferably 0.5 to 1.5 mass % (see Patent Document 2).

PRIOR ART DOCUMENTS

Patent Documents

Patent Document 1: Japanese Patent Application Laid-Open (kokai) No. 2002-370035
Patent Document 2: Japanese Patent Application Laid-Open (kokai) No. 2012-16685

SUMMARY OF THE INVENTION

Problems to be Solved by the Invention

However, although the thus-elaborated catalyst carriers exhibited excellent gas purification performance as compared with conventional aluminum borate, there is still demand for further improvement in catalytic performance which can clear the regulation of automobile exhaust gas which has become more strict in recent years.

Thus, an object of the present invention is to provide an exhaust gas purification catalyst system which can clear the regulation of automobile exhaust gas which has become more strict in recent years, and a method for purifying exhaust gas employing the catalyst system.

Means for Solving the Problems

The present inventors have conducted extensive studies in order to attain the aforementioned objects, and have found that, when an exhaust gas purification catalyst is employed in an exhaust gas purification system for a vehicle in which an exhaust gas purification catalyst is disposed in a front section in the vicinity of an engine and in a rear section in the vicinity of an exhaust outlet; i.e., a partial zero emission vehicle (PZEV), and aluminum borate is employed serving as a carrier, wherein aluminum borate, in particular, aluminum borate carrier which has excellent heat resistance and an aluminum oxide to boron oxide ratio of 10:2 to 9:2 is used as an lower layer of a multi-layer structure of a front section of the exhaust gas purification catalyst, CO, HC, and $NO_x$ removal performances can be considerably improved. The present invention has been accomplished on the basis of this finding.

Accordingly, a characteristic feature of the exhaust gas purification catalyst system of the present invention resides in that, in an exhaust gas purification system for use in an automobile in which an exhaust gas purification catalyst product is disposed in both a front section and a rear section, the exhaust gas purification catalyst product of the front section has a layered catalyst including a lower layer which contains aluminum borate.

Also, a characteristic feature of the exhaust gas purification method of the present invention resides in that an exhaust gas of an automobile is purified by an exhaust gas purification catalyst system including an exhaust gas purification catalyst product disposed in both a front section and a rear section of the automobile, the exhaust gas purification catalyst product of the front section having a layered catalyst including a lower layer which contains aluminum borate.

The lower layer of the layered catalyst of the exhaust gas purification catalyst product in the front section preferably contains aluminum borate having a ratio by mole of aluminum oxide to boron oxide of 10:2 to 9:2.

Also preferably, the lower layer of the layered catalyst of the exhaust gas purification catalyst product in the front section contains aluminum borate having a ratio by mole of aluminum oxide to boron oxide of 10:2 to 9:2, and the aluminum borate is modified with $La_2O_3$ in an amount of 0.3 to 2 mass % with respect to the mass of aluminum borate.

Preferably, the lower layer of the layered catalyst of the exhaust gas purification catalyst product in the front section contains aluminum borate having a ratio by mole of aluminum oxide to boron oxide of 10:2 to 9:2, and includes a carrier made of the aluminum borate which is modified with $La_2O_3$ in an amount of 0.3 to 2 mass % with respect to the mass of aluminum borate, and Pd supported on the carrier.

Preferably, the lower layer of the layered catalyst of the exhaust gas purification catalyst product in the front section contains aluminum borate having a ratio by mole of aluminum oxide to boron oxide of 10:2 to 9:2, and includes a carrier made of the aluminum borate which is modified with $La_2O_3$ in an amount of 0.3 to 2 mass % with respect to the mass of aluminum borate, and Pd and Ba supported on the carrier.

In the layered catalyst of the exhaust gas purification catalyst product in the front section, an upper layer provided on the lower layer preferably includes a rhodium catalyst layer.

Effects of the Invention

The exhaust gas purification catalyst system of the present invention exhibits excellent exhaust gas purification performance after long-term use thereof under high-temperature conditions, when the catalyst system is used in an exhaust gas purification system for a PZEV, in which an exhaust gas purification catalyst is disposed in both a front section in the vicinity of an engine and a rear section in the vicinity of an exhaust outlet. In addition, since a catalyst carrier having a high noble metal (in particular, Pd) dispersion degree is employed in a lower layer of the exhaust gas purification catalyst product in the front section, CO removal performance, HC removal performance, and $NO_x$ removal performance can be enhanced in an LA4 evaluation mode.

According to the exhaust gas purification method of the present invention, the employed exhaust gas purification catalyst system exhibits excellent exhaust gas purification performance after long-term use thereof under high-temperature conditions, when the catalyst system is used in an exhaust gas purification system for a PZEV, in which an exhaust gas purification catalyst is disposed in both a front section in the vicinity of an engine and a rear section in the vicinity of an exhaust outlet. In addition, since exhaust gas purification is carried out by use of an exhaust gas purification catalyst product in the front section, which product employs a catalyst carrier having a high noble metal (in particular, Pd) dispersion degree in a lower layer, CO removal performance, HC removal performance, and $NO_x$ removal performance can be enhanced in an LA4 evaluation mode.

MODES FOR CARRYING OUT THE INVENTION

Figure 1:
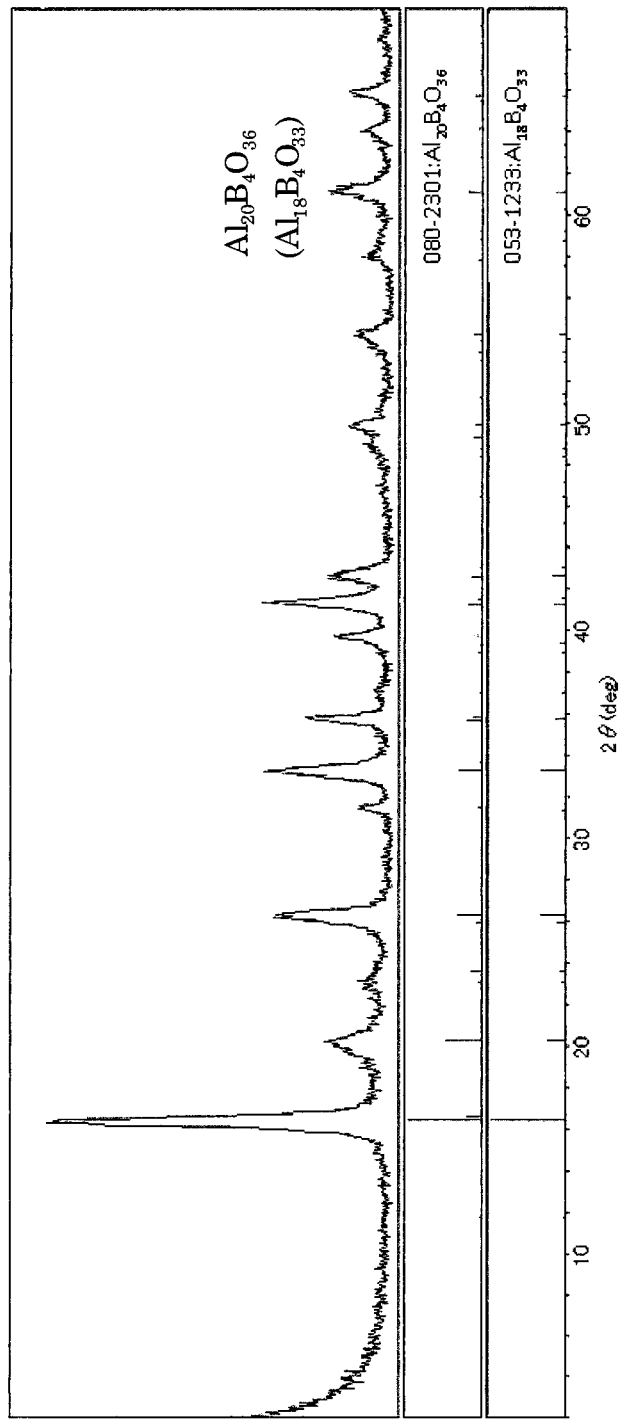
FIG. 1 An X-ray diffraction chart of aluminum borate produced in a production example.

The exhaust gas purification catalyst system of the present invention is characterized in that, in an exhaust gas purification system for use in an automobile in which an exhaust gas purification catalyst product is disposed in both a front section and a rear section, the exhaust gas purification catalyst product of the front section has a layered catalyst including a lower layer which contains aluminum borate.

Among such aluminum borate species, aluminum borate having a ratio by mole of aluminum oxide to boron oxide of 10:2 to 9:2 is preferred.

Particularly preferably, the aluminum borate has a ratio by mole of aluminum oxide to boron oxide of 10:2 to 9:2, and is modified with $La_2O_3$ in an amount of 0.3 to 2 mass % with respect to the mass of aluminum borate.

As used herein, "aluminum borate has a ratio by mole of aluminum oxide to boron oxide of 10:2 to 9:2" encompasses aluminum borate represented by formula $10Al_2O_3.2B_2O_3$ ($5Al_2O_3:B_2O_3$, $Al_{20}B_4O_{36}$) and aluminum borate represented by formula $9Al_2O_3.2B_2O_3$ ($Al_{18}B_4O_{33}$). Hereinafter, such aluminum borate is referred to as aluminum borate having a specific composition. When the aluminum borate is modified with $La_2O_3$, the product is called an "$La_2O_3$-modified aluminum borate having a specific composition."

The characteristics and production method of the aluminum borate employed in the invention and having a specific composition are disclosed in, for example, Siba P. Ray, "Preparation and Characterization of Aluminum Borate", J. Am. Ceram. Soc., 75[9], p. 2605-2609 (1992). Conventionally, aluminum borate is represented by a formula $9Al_2O_3.2B_2O_3$ ($Al_{18}B_4O_{33}$), obtained through chemical analysis. However, a thesis (Martin et al., "Crystal-chemistry of mullite-type aluminoborates $Al_{18}B_4O_{33}$ and $Al_5BO_9$: A stoichiometry puzzle", Journal of Solid State Chemistry 184(2011) p. 70-80) discloses that aluminum borate is represented by $Al_5BO_9$ ($5Al_2O_3:B_2O_3$, $Al_{20}B_4O_{36}$); i.e., formula $10Al_2O_3.2B_2O_3$. The thesis also discloses that aluminum borate may be represented by either formula $9Al_2O_3.2B_2O_3$ ($Al_{18}B_4O_{33}$) or $Al_5BO_9$ ($5Al_2O_3:B_2O_3$, $Al_{20}B_4O_{36}$), meaning that the two formulas represent a unique substance.

Thus, in the present invention, the aluminum borate employed in the lower layer of the front section and having a specific composition encompasses aluminum borate represented by formula $10Al_2O_3.2B_2O_3$ ($5Al_2O_3:B_2O_3$, $Al_{20}B_4O_{36}$) and aluminum borate represented by formula $9Al_2O_3.2B_2O_3$ ($Al_{18}B_4O_{33}$).

Meanwhile, the aluminum borate having a specific composition is known to have pores having a pore diameter of about 0.4 nm in the crystal structure thereof. Preferably, such aluminum borate is modified with $La_2O_3$ in an amount of 0.3 to 2 mass % with respect to the mass of aluminum borate, more preferably 0.4 to 2 mass %, still more preferably 0.5 to 1.5 mass %. When the $La_2O_3$ amount is 0.3 to 2 mass % with respect to the mass of aluminum borate, the exhaust gas purification performance of the catalyst is considerably improved, even after long-term use thereof under high-temperature conditions.

The carrier for the exhaust gas purification catalyst of the present invention may be formed of the aforementioned aluminum borate as a single component, or a mixture of the aforementioned aluminum borate with a binder generally employed in a three-way catalyst (e.g., alumina) or with a carrier having oxygen storage capacity (OSC) (e.g., $CeO_2$—$ZrO_2$). In other words, the carrier for the exhaust gas purification catalyst of the present invention essentially contains the aforementioned aluminum borate.

The carrier for the exhaust gas purification catalyst of the present invention may be formed of the aforementioned $La_2O_3$-modified aluminum borate as a single component, or of a mixture of the aforementioned $La_2O_3$-modified aluminum borate with a binder generally employed in a three-way catalyst (e.g., alumina) or with a carrier having oxygen storage capacity (OSC) (e.g., $CeO_2$—$ZrO_2$). In other words, the carrier for the exhaust gas purification catalyst of the present invention essentially contains the aforementioned $La_2O_3$-modified aluminum borate.

When any noble metal of Pd, Rh, and Pt is deposited on the aforementioned exhaust gas purification catalyst carrier of the present invention, a drop in noble metal dispersion degree and noble metal sintering, after long-term use of the catalyst under high-temperature conditions, can be suppressed. However, particularly when the noble metal is Pd, the effects are remarkable. When Pd is employed in a lower layer in the front section, CO removal performance, HC removal performance, and $NO_x$ removal performance can be remarkably enhanced in an LA4 evaluation mode.

The lower layer of the exhaust gas purification layered catalyst in the front section according to the present invention is preferably formed by depositing Pd on a carrier containing the aforementioned $La_2O_3$-modified aluminum borate. The amount of Pd, based on the mass of the carrier, is preferably 0.3 to 3 mass %, more preferably 0.4 to 2 mass %. Through deposition of Pd on the aforementioned $La_2O_3$-modified aluminum borate, a drop in Pd dispersion degree and Pd sintering, after long-term use of the catalyst under high-temperature conditions, can be suppressed, as compared with the case where Pd is deposited on $CeO_2$—$ZrO_2$ having oxygen storage capacity or the case where Pd is deposited on La-stabilized alumina. When Pd-deposited $La_2O_3$-modified aluminum borate is employed in a lower layer in the front section, CO removal performance, HC removal performance, and $NO_x$ removal performance can be remarkably enhanced in an LA4 evaluation mode.

Generally, La-stabilized alumina is thermally unstable, since it undergoes phase transition at about 1,000° C. In contrast, the $La_2O_3$-modified aluminum borate of the present invention having a specific composition does not undergo phase transition at about 1,000° C., thereby ensuring thermal stability. Therefore, the exhaust gas purification catalyst layer of the present invention exhibits a higher effect, when employed in the front section of the engine, which is exposed to higher temperature.

In addition, when the exhaust gas purification catalyst layer of the present invention is employed in the front section receiving a heavy thermal load, deterioration of Pd can be effectively suppressed in the case where the catalyst layer is employed as a lower layer rather than an upper layer. When the $La_2O_3$-modified aluminum borate of the present invention having a specific composition is employed in the front section, desired effects can be attained.

When serving as a lower layer in the front section, the exhaust gas purification catalyst layer of the present invention is preferably such that Pd and Ba are deposited on the aforementioned carrier containing $La_2O_3$-modified aluminum borate. Through deposition of Pd and Ba, the oxygen-release temperature of PdO can be elevated, whereby the catalytic action of Pd can be enhanced. The amount and effects of Pd are the same as described above. The amount of Ba, as reduced to the mass of BaO and based on the mass of metallic Pd, is preferably 2 to 3 mass %, more preferably 2 to 2.5 mass %.

The exhaust gas purification catalyst product of the front section of the exhaust gas purification catalyst system of the present invention is provided by forming and depositing a lower layer made of the aforementioned exhaust gas purification catalyst on a catalyst support formed of a ceramic or metallic material. The amount of exhaust gas purification catalyst supported is preferably 70 to 300 g/L, more preferably 100 to 230 g/L. No particular limitation is imposed on the shape of the catalyst support, and the support is generally in the form of honeycomb, plate, pellet, etc., with a honeycomb shape being preferred. Examples of the material of the catalyst support include ceramic materials such as alumina ($Al_2O_3$), mullite ($3Al_2O_3 \cdot 2SiO_2$), and cordierite ($2MgO \cdot 2Al_2O_3 \cdot 5SiO_2$), and metallic materials such as stainless steel.

The exhaust gas purification catalyst product of the front section employed in the present invention is provided by forming the aforementioned lower layer on the catalyst support, and forming, on the lower layer, an upper layer made of a catalyst layer having a different composition, whereby the upper layer is deposited on the lower layer. The upper layer preferably contains Rh.

A combination of Rh and Pd is effective for smoothly causing redox reaction. However, Pd has poor resistance to poisoning, and Rh has a poisoning resistance higher than that of Pd. Thus, when the exhaust gas purification layered catalyst is placed in the front section receiving a heavy thermal load, the upper layer, which is particularly exposed to poisoning conditions, preferably contains Rh.

The amount of Rh contained in the upper layer, based on the mass of the carrier in the Rh catalyst layer, is preferably 0.1 to 0.6 mass %, more preferably 0.1 to 0.4 mass %. In this form of the exhaust gas purification catalyst product, the Pd:Rh ratio is preferably 3 to 20:1, more preferably 5 to 20:1. In the case of a honeycomb-shape catalyst support, the amount of the lower layer deposited is preferably 70 to 200 g/L, more preferably 100 to 160 g/L. The amount of the upper layer deposited is preferably 30 to 100 g/L, more preferably 50 to 70 g/L, from the viewpoints of heat resistance, gas diffusivity to the lower layer, exhausting of pressure, etc.

Next will be described the method for producing the aforementioned exhaust gas purification catalyst employed in the lower layer of the front section of the present invention. Firstly, aluminum borate represented by formula $9Al_2O_3 \cdot 2B_2O_3$ is mixed with a solution of a lanthanum compound, and the mixture is dried to solid through evaporation, followed by firing, to thereby yield an $La_2O_3$-modified aluminum borate having an aluminum oxide to boron oxide ratio of 10:2 to 9:2. Then, the thus-modified aluminum borate is mixed with a Pd compound, or the thus-modified aluminum borate is mixed with a solution of a Ba compound and a Pd compound. Thereafter, the mixture is dried to solid through evaporation, followed by firing. The steps of the procedure will next be described in detail. Notably, in the present specification, claims, etc., no particular limitation is imposed on the solution which forms the "solution," so long as the solvent can form the solution. Among such solvents, water is generally used.

The aluminum borate having an aluminum oxide to boron oxide ratio of 10:2 to 9:2, which is used in the production of the aforementioned exhaust gas purification catalyst, is commercially available. On a laboratory scale, the following production procedure may be employed. Specifically, to a three-neck flask dipped in a hot bath at 50° C., there are added a solvent (e.g., 2-propanol, butanol, or ethanol) (1.5 L), an Al alkoxide (e.g., aluminum ethoxide, aluminum isopropoxide, aluminum triisopropoxide, aluminum n-butoxide, aluminum s-butoxide, aluminum t-butoxide, aluminum tributoxide, aluminum phenoxide, aluminum ethoxyethoxyethoxide) pulverized by means of an agate mortar (200 g), and a B alkoxide (e.g., boron n-propoxide, boron trimethylsiloxide, boron ethoxyethoxide, boron vinyldimethylsiloxide, boron allyloxide, boron n-butoxide, boron t-butoxide, boron ethoxide, boron isopropoxide, or boron methoxide) (40.9 g), and the mixture is stirred under $N_2$ gas. When aluminum isopropoxide is used as an Al alkoxide, 2-propanol is formed in the course of hydrolysis of aluminum isopropoxide. Thus, 2-propanol is preferably used as a solvent in the production. After complete dissolution of the Al alkoxide, a mixture (24.6 g) of a solvent (e.g. 2-propanol) and water (1:1) is slowly added dropwise to the solution, to thereby cause hydrolysis, whereby a white gel substance is formed. The thus-formed precipitated matter is washed sequentially with ethanol and pure water, and the mixture is filtered. The solid is dried overnight (for about 15 hours) at 120° C. and then fired in air at 300° C. for 3 hours and further fired in air at 1,000° C. for 5 hours, to thereby yield aluminum borate as a white substance. Through X-ray diffraction, the product is identified as aluminum borate represented by formula $9Al_2O_3 \cdot 2B_2O_3$.

In the production method for the exhaust gas purification catalyst of the present invention, aluminum borate having an aluminum oxide to boron oxide ratio of 10:2 to 9:2 may be mixed with a lanthanum compound (i.e., a soluble lanthanum compound; e.g., lanthanum nitrate, lanthanum acetate, lanthanum chloride, lanthanum bromide, or lanthanum sulfate) through mixing aluminum borate-containing slurry with the lanthanum compound, or through adding aluminum borate to a solution of the lanthanum compound. In this case, the ratio in amount of lanthanum compound to aluminum borate is adjusted to 0.3 to 2 mass % of $La_2O_3$, based on the mass of aluminum borate after firing, preferably 0.4 to 2 mass %, more preferably 0.5 to 1.5 mass %.

Subsequently, the product is dried to solid overnight (for about 15 hours) at 120° C., so that the lanthanum compound is deposited substantially uniformly on aluminum borate, and the product is fired in air at 600° C. for 3 hours, to thereby yield an $La_2O_3$-modified aluminum borate having a specific composition; i.e., the exhaust gas purification catalyst carrier of the present invention.

Subsequently, the thus-prepared $La_2O_3$-modified aluminum borate having an aluminum oxide to boron oxide ratio of 10:2 to 9:2 is mixed with a solution of a Pd compound (a soluble Pd compound; e.g., Pd nitrate, Pd chloride, or Pd sulfate). In this case, there may be used with a common carrier generally employed in a three-way catalyst or with a carrier having oxygen storage capacity (OSC) (e.g., $CeO_2$—$ZrO_2$). The ratio in amount of carrier to Pd compound is preferably adjusted to 0.5 to 3 mass %, of deposited Pd after firing, based on the total mass of the carrier, more preferably 0.7 to 2 mass %.

In the production of a Pd- and Ba-deposited exhaust gas purification catalyst, the thus-prepared $La_2O_3$-modified aluminum borate having a having an aluminum oxide to boron oxide ratio of 10:2 to 9:2 is mixed with a solution containing a Ba compound (e.g., barium oxide, barium nitrate, barium acetate, barium oxalate, barium hydroxide, or barium carbonate) and a Pd compound (a soluble Pd compound; e.g., Pd nitrate, Pd chloride, or Pd sulfate). In this case, there may be used with a common carrier generally employed in a three-way catalyst or with a carrier having oxygen storage capacity (OSC) (e.g., $CeO_2$—$ZrO_2$). The ratio in amount of carrier to Pd compound is adjusted to fall within the above range, and the amount of Ba compound, as reduced to BaO and based on the mass of metallic Pd, is preferably adjusted to 2 to 3 mass %, more preferably 2 to 2.5 mass %.

Subsequently, the product is dried to solid overnight (for about 15 hours) at 120° C., so that the Pd compound and Ba compound are deposited substantially uniformly on a carrier, and the product is fired in air at 600° C. for 3 hours, to thereby yield a catalyst which falls within the scope of the exhaust gas purification catalyst carrier of the present invention; in which Pd or Pd and Ba are deposited in an $La_2O_3$-modified aluminum borate having a specific composition.

The exhaust gas purification catalyst product employed in the exhaust gas purification catalyst system of the present invention may be produced through, for example, the following procedure. Firstly, an $La_2O_3$-modified aluminum borate having an aluminum borate to boron oxide ratio of 10:2 to 9:2, a binder, an optional carrier having oxygen storage capacity (OSC) (e.g., $CeO_2$—$ZrO_2$), and an optional solution containing a Ba compound and a Pd compound are mixed together through wet pulverization, to thereby prepare a slurry. The thus-prepared slurry is applied onto a catalyst support, dried, and fired, through a widely known technique, to thereby yield an exhaust gas purification catalyst product including a catalyst support and a lower layer formed of an exhaust gas purification catalyst supported on the catalyst carrier. On the catalyst layer, an upper layer formed an Rh catalyst layer may be disposed, and such an exhaust gas purification catalyst product may be obtained through the same procedure.

Other than the Rh catalyst layer, the upper layer may be a Pt—Rh catalyst layer, a Pd catalyst layer, or the like.

The concept "lower layer" in the present invention refers not only to the bottom layer of a bilayer structure, but also to a layer of a multilayer (3 or more layers) structure other than the uppermost layer. Thus, in the aforementioned case, an additional catalyst layer may be disposed between the catalyst support and the lower layer containing aluminum borate. Alternatively, a plurality of catalyst layers may be disposed on the lower layer containing aluminum borate.

Meanwhile, no particular limitation is imposed on the exhaust gas purification catalyst product disposed in the rear section, and a conventionally used exhaust gas purification catalyst product may be employed. For example, a catalyst product including a Pd catalyst lower layer and an Rh catalyst upper layer may be employed.

The present invention will next be described in detail by way of examples and comparative examples.

PRODUCTION EXAMPLE 1

Aluminum Borate Having a Specific Composition

To a three-neck flask dipped in a hot bath at 50° C., 2-propanol (1.5 L), aluminum isopropoxide (200 g) pulverized by means of an agate mortar, and boron n-propoxide (40.9 g) were added, so that the aluminum oxide to boron oxide ratio was adjusted to 9:2. The mixture was stirred under $N_2$ gas. After complete dissolution of aluminum isopropoxide (i.e., after formation of transparent solution), a mixture (24.6 g) of 2-propanol and water (1:1) was slowly added dropwise to the solution, to thereby cause hydrolysis, whereby a white gel substance was formed. The thus-formed precipitated matter was washed sequentially with ethanol and pure water, and the mixture was filtered. The solid was dried overnight (for about 15 hours) at 120° C. and then fired in air at 300° C. for 3 hours and further fired in air at 1,000° C. for 5 hours, to thereby yield aluminum borate as a white substance. Through X-ray diffraction, the product was identified as aluminum borate represented by formula $10Al_2O_3.2B_2O_3$. The product can also be identified as aluminum borate represented by formula $9Al_2O_3.2B_2O_3$ ($Al_{18}B_4O_{33}$).

FIG. 1 shows the X-ray diffraction results of the aluminum borate produced in Production Example 1, in comparison with the standard card data of aluminum borate represented by formula $10Al_2O_3.2B_2O_3$ ($Al_{20}B_4O_{36}$) and aluminum borate represented by formula $9Al_2O_3.2B_2O_3$ ($Al_{18}B_4O_{33}$).

The thus-prepared aluminum borate was immersed in aqueous lanthanum nitrate. The amount of lanthanum nitrate in the aqueous lanthanum nitrate was found to be such that the $La_2O_3$ content of the target $La_2O_3$-modified aluminum borate having a specific composition was adjusted to 0.5 mass % with respect to the mass of aluminum borate. Thereafter, the thus-treated product was subjected to evaporation overnight (for about 15 hours) at 120° C., and then the obtained solid was fired in air at 600° C. for 3 hours, to thereby yield aluminum borate having a specific composition modified with 1 mass % of $La_2O_3$.

Subsequently, the above-prepared aluminum borate having a specific composition modified with 1 mass % of $La_2O_3$ was immersed in aqueous Pd nitrate. The Pd nitrate content of the aqueous Pd nitrate, as reduced to metallic Pd content, was adjusted to 0.4 mass % with respect to the aluminum borate having a specific composition modified with 1 mass % of $La_2O_3$. Thereafter, the thus-treated product was subjected to evaporation overnight overnight (for about 15 hours) at 120° C., and then the solid was fired in air at 600° C. for 3 hours, to thereby yield an exhaust gas purification catalyst.

PRODUCTION EXAMPLE 2

Aluminum Borate Having a Specific Composition

To a three-neck flask dipped in a hot bath at 50° C., 2-propanol (1.5 L), aluminum isopropoxide (222.2 g) pulverized by means of an agate mortar, and boron n-propoxide (40.9 g) were added, so that the aluminum oxide to boron oxide ratio was adjusted to 10:2, and the mixture was stirred under $N_2$ gas. After complete dissolution of aluminum isopropoxide (i.e., after formation of transparent solution), a mixture (24.6 g) of 2-propanol and water (1:1) was slowly added dropwise to the solution, to thereby cause hydrolysis, whereby a white gel substance was formed. The thus-formed precipitated matter was washed sequentially with ethanol and pure water, and the mixture was filtered. The solid was dried overnight (for about 15 hours) at 120° C. and then fired in air at 300° C. for 3 hours and further fired in air at 1,000° C. for 5 hours, to thereby yield aluminum borate as a white substance. Through X-ray diffraction, the product was identified as aluminum borate represented by formula $10Al_2O_3$-$2B_2O_3$. The product can also be identified as aluminum borate represented by formula $9Al_2O_3 \cdot 2B_2O_3$ ($Al_{18}B_4O_{33}$).

As a result, through adjusting the compositional ratio so that the aluminum oxide to boron oxide ratio was adjusted to 9:2 or 10:2, substantially the same substance was found to be produced.

Figure 2:
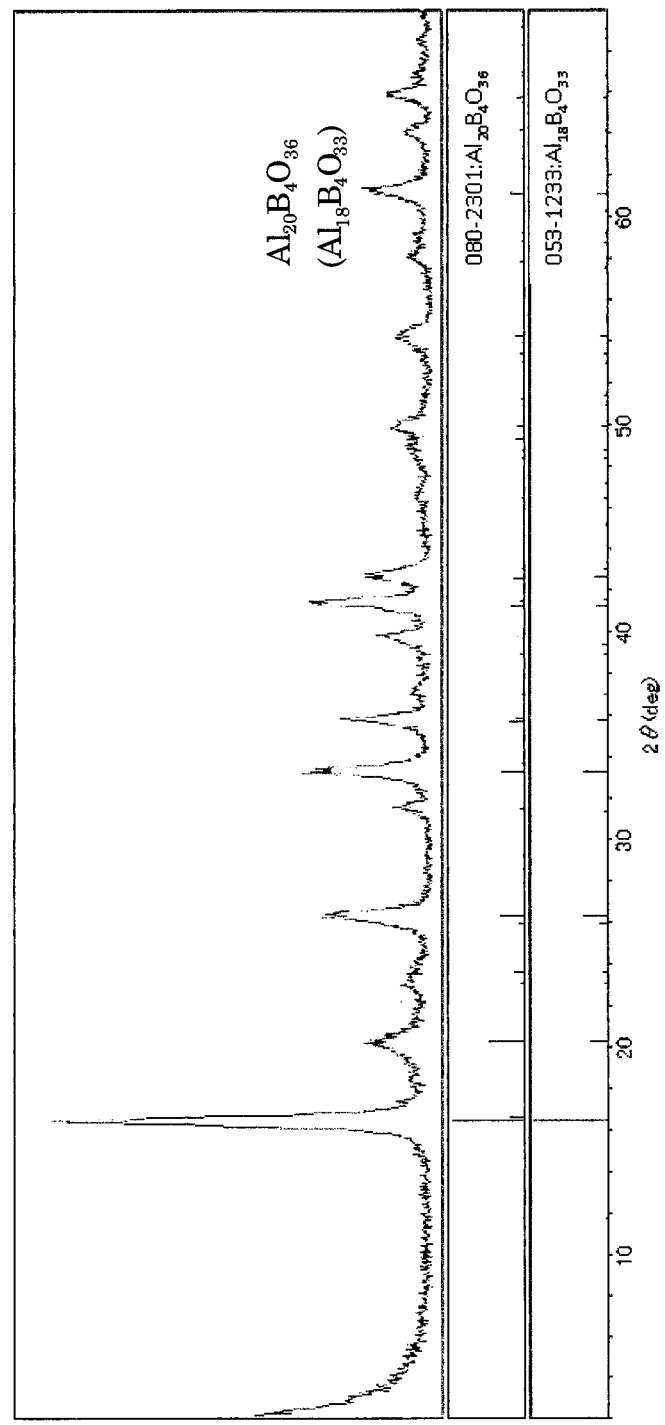
FIG. 2 An X-ray diffraction chart of aluminum borate produced in another production example.

FIG. 2 shows the X-ray diffraction results of the aluminum borate produced in Production Example 2, in comparison with the standard card data of aluminum borate represented by formula $10Al_2O_3 \cdot 2B_2O_3$ ($Al_{20}B_4O_{36}$) and aluminum borate represented by formula $9Al_2O_3 \cdot 2B_2O_3$ ($Al_{18}B_4O_{33}$)

Production of a Catalyst Product Including a Lower Layer Containing Aluminum Borate (Hereinafter Referred to as Catalyst Product A)

The aluminum borate having a specific composition modified with 1 mass % of $La_2O_3$ (45.6 parts by mass), $CeO_2$—$ZrO_2$ complex oxide (45.6 parts by mass), aluminum nitrate (2.0 parts by mass, as reduced to aluminum oxide), and an alumina binder (6.0 parts by mass) were added to aqueous Pd nitrate, and the mixture was subjected to wet pulverization, to thereby prepare a Pd-containing slurry. The amount of Pd in the aqueous Pd nitrate was found to be 1.0 mass % with respect to the solid content. The thus-prepared slurry was applied onto a ceramic honeycomb (catalyst support, 1-L size) at a coating amount of 100 g/L, dried, and fired.

Separately, $Nd_2O_3$—$ZrO_2$ complex oxide (70.3 parts by mass), La-stabilized alumina (23.4 parts by mass), and an alumina binder (6.0 parts by mass) were added to aqueous Rh nitrate, and the mixture was subjected to wet pulverization, to thereby prepare an Rh-containing slurry. The amount of Rh in the aqueous Rh nitrate was found to be 0.2 mass % with respect to the solid content. The thus-prepared slurry was applied onto the ceramic honeycomb (catalyst support, 1-L size) at a coating amount of 100 g/L, dried, and fired, to thereby yield catalyst product A.

Production of a Catalyst Product Including a Lower Layer Containing No Aluminum Borate (Hereinafter Referred to as Catalyst Product B)

The above-procedure was repeated, except that an equiamount of La-stabilized alumina was used instead of the aluminum borate having a specific composition modified with 1 mass % of $La_2O_3$, to thereby yield catalyst product B.

EXAMPLE 1

Actual automobiles are generally equipped with two catalysts; one being disposed in a front section in the vicinity of the engine and the other in a rear section in the vicinity of an exhaust outlet apart from the engine.

Catalyst product A was subjected to a thermal treatment (950° C. for 50 hours) as an acceleration test (a high-temperature treatment simulating the conditions in the front section) and then placed in the front section of a PZEV.

Catalyst product B was subjected to a thermal treatment (900° C. for 50 hours) as an acceleration test (a high-temperature treatment simulating the conditions in the rear section) and then placed in the rear section of the PZEV.

In evaluation mode LA4, the emission amounts of CO, HC, and NOx were determined.

COMPARATIVE EXAMPLE 1

Catalyst product B was subjected to a thermal treatment (950° C. for 50 hours) as an acceleration test (a high-temperature treatment simulating the conditions in the front section) and then placed in the front section of a PZEV.

Catalyst product A was subjected to a thermal treatment (900° C. for 50 hours) as an acceleration test (a high-temperature treatment simulating the conditions in the rear section) and then placed in the rear section of the PZEV.

In evaluation mode LA4, the emission amounts of CO, HC, and NOx were determined.

COMPARATIVE EXAMPLE 2

Catalyst product B was subjected to a thermal treatment (950° C. for 50 hours) as an acceleration test (a high-temperature treatment simulating the conditions in the front section) and then placed in the front section of a PZEV.

Another catalyst product B was subjected to a thermal treatment (900° C. for 50 hours) as an acceleration test (a high-temperature treatment simulating the conditions in the rear section) and then placed in the rear section of the PZEV.

In evaluation mode LA4, the emission amounts of CO, HC, and NOx were determined.

Figure 3:
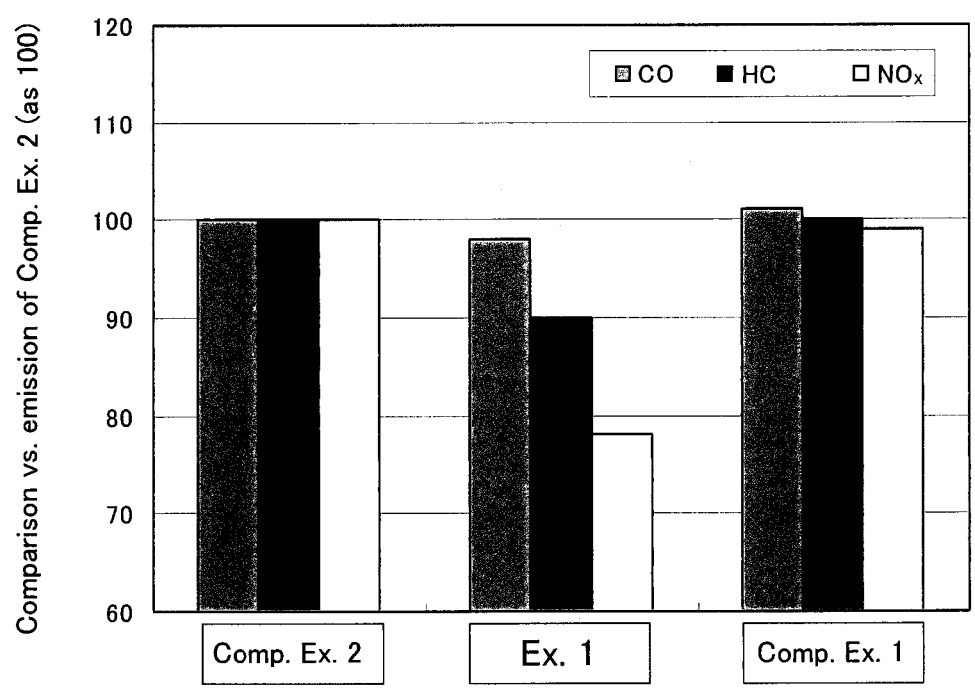
FIG. 3 A graph showing the results of Test Example.

FIG. 3 shows the results of Example 1 and Comparative Examples 1 and 2.

As is clear from FIG. 3, when the lower layer in the front section employed aluminum borate having a specific composition, CO removal performance, HC removal performance, and NOx removal performance in evaluation mode LA4 were found to be gas-specifically enhanced.

In contrast, when the lower layer in the rear section employed aluminum borate, CO removal performance and HC removal performance in evaluation mode LA4 were found to be unchanged.

La-stabilized alumina, which undergoes phase transition at about 1,000° C., is thermally unstable. However, aluminum borate, which undergoes no phase transition at about 1,000° C., is thermally stable. Therefore, aluminum borate was found to exhibit more effective catalytic performance when employed in the front section, which is exposed to higher temperature conditions.

The invention claimed is:

1. An exhaust gas purification catalyst system for use in an automobile in which an exhaust gas purification catalyst product is disposed in both a front section and a rear section, characterized in that the exhaust gas purification catalyst product of the front section has a layered catalyst including a lower layer which contains aluminum borate.

2. An exhaust gas purification catalyst system according to claim 1, wherein the aluminum borate includes aluminum borate having a ratio by mole of aluminum oxide to boron oxide of 10:2 to 9:2.

3. An exhaust gas purification catalyst system according to claim 2, wherein the aluminum borate includes aluminum borate which is modified with $La_2O_3$ in an amount of 0.3 to 2 mass % with respect to the mass of aluminum borate.

4. An exhaust gas purification catalyst system according to claim 3, wherein the lower layer includes a carrier containing the aluminum borate, and Pd supported on the carrier.

5. An exhaust gas purification catalyst system according to claim 3, wherein the lower layer includes a carrier containing the aluminum borate, and Pd and Ba supported on the carrier.

6. An exhaust gas purification catalyst system according to claim 2, wherein the lower layer includes a carrier containing the aluminum borate, and Pd supported on the carrier.

7. An exhaust gas purification catalyst system according to claim 6, wherein of the layered catalyst includes an upper layer containing Rh.

8. An exhaust gas purification catalyst system according to claim 2, wherein the lower layer includes a carrier containing the aluminum borate, and Pd and Ba supported on the carrier.

9. An exhaust gas purification catalyst system according to claim 2, wherein of the layered catalyst includes an upper layer containing Rh.

10. An exhaust gas purification catalyst system according to claim 1, wherein the lower layer includes a carrier containing the aluminum borate, and Pd supported on the carrier.

11. An exhaust gas purification catalyst system according to claim 10, wherein of the layered catalyst includes an upper layer containing Rh.

12. An exhaust gas purification catalyst system according to claim 10, wherein of the layered catalyst includes an upper layer containing Rh.

13. An exhaust gas purification catalyst system according to claim 1, wherein the lower layer includes a carrier containing the aluminum borate, and Pd and Ba supported on the carrier.

14. An exhaust gas purification catalyst system according to claim 1, wherein of the layered catalyst includes an upper layer containing Rh.

15. An exhaust gas purification method, comprising purifying an exhaust gas of an automobile by an exhaust gas purification catalyst system including an exhaust gas purification catalyst product disposed in both a front section and a rear section of the automobile, the exhaust gas purification catalyst product of the front section having a layered catalyst including a lower layer which contains aluminum borate.

* * * * *